United States Patent Office 3,478,900
Patented Nov. 18, 1969

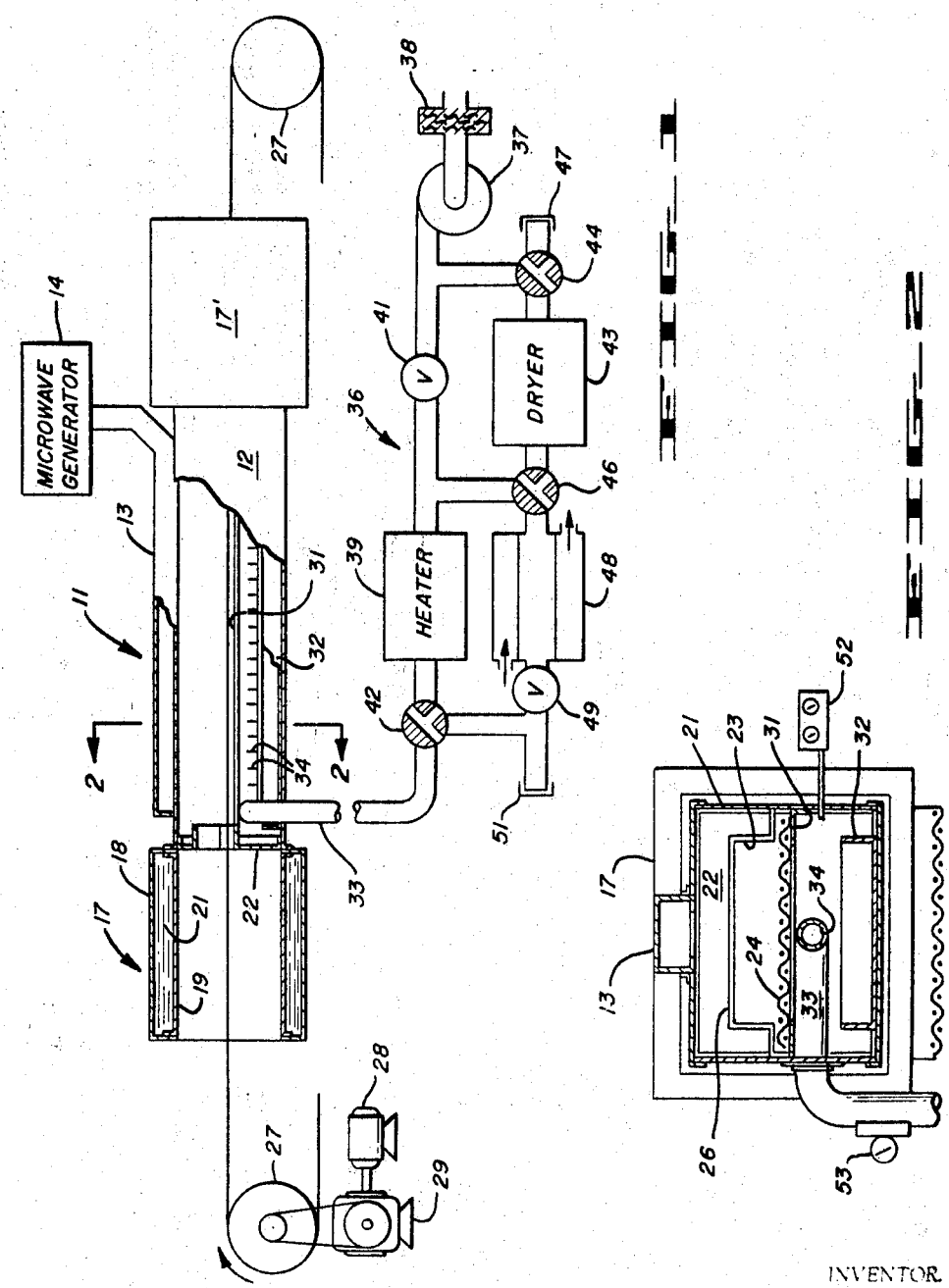

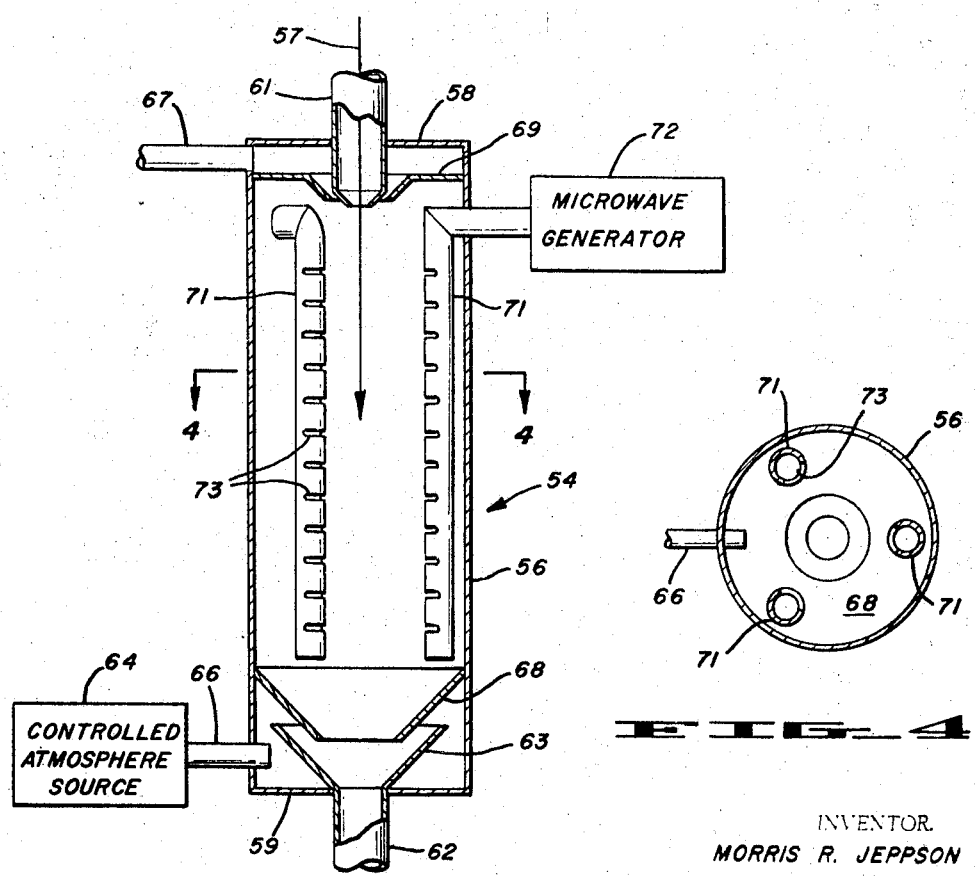

3,478,900
APPARATUS FOR TREATING FOOD PRODUCTS AND THE LIKE WITH MICROWAVE ENERGY
Morris R. Jeppson, Danville, Calif., assignor to Cryodry Corporation, San Ramon, Calif., a corporation of California
Original application Nov. 28, 1966, Ser. No. 604,106, now Patent No. 3,409,477, dated Nov. 5, 1968. Divided and this application Jan. 10, 1968, Ser. No. 696,899
Int. Cl. H05b 9/06, 5/00
U.S. Cl. 219—10.55                10 Claims

ABSTRACT OF THE DISCLOSURE

The blanching or cooking of a food product preceding preservative treatment is accomplished by microwave irradiation combined with exposure to a controlled hot gas flow in a continuous process chamber. By programming the gas humidity from an initially high value to a low value, fast controlled heating is effected without leaching solids from the product or adding to the moisture content thereof. A partial drying is accomplished thereby reducing the energy requirements and processing times for the subsequent preservation steps such as freezing, drying or the like.

CROSS REFERENCES TO RELATED APPLICATIONS

This application is a division of application Ser. No. 604,106, filed Nov. 28, 1966, which application is a continuation-in-part of co-pending application Ser. No. 342,179, "Method and Apparatus for Treating Food Products and the Like With Microwave Energy," filed Feb. 3, 1964 by Morris R. Jeppson and now abandoned.

BACKGROUND OF THE INVENTION

This invention relates to the processing of food products and the like and more particularly to an apparatus for heat treating such products as a preliminary step in a preservative process, such as freezing or drying, of the class which primarily affects the moisture content of the product.

Several highly advantageous food preservation techniques are basically methods for removing or inactivating the moisture content of the product. Drying, by any of several methods, and freezing are examples. Freeze drying involves both effects. In each case, the basic process is essentially one of transmitting heat to or from the cellular moisture within the food. A substantial energy input is required to promote the necessary heat flow where such process is performed on a large scale. Any techniques which can reduce power requirements, or reduce processing time, have a pronounced effect on costs.

It is frequently necessary to heat the product as a preliminary step in a preservative treatment of the type discussed above. This may variously be done in order to provide a pre-cooked product or to blanch the food in order to inactivate enzymes therein. The methods and equipment heretofore used for this purpose have not been designed to facilitate the subsequent steps in the preservative treatment and in many cases have actually added to the cost and processing times of the latter.

Blanching, for example, has typically been done by passing the product through a steam chamber or a hot water bath. This actually increases the moisture content of the product, by a factor of 10% in some instances. The added water must subsequently be evaporated, frozen, and sublimed in some cases, together with the natural moisture of the food. The added moisture may substantially increase the cost and time required for the subsequent preservative processing.

Moreover, conventional steam or hot water blanching has further adverse effects when performed as a preliminary step to any of the several known methods of dehydration. In addition to overheating the product surface, steam or hot water can leach 8% or more of the solids, including flavor elements, from the food. This has serious cost consequences, in addition to the effect on quality, inasmuch as it is primarily solids which constitute the finished product in a dehydration process.

Thus, the heat treatments presently used as a preliminary step in drying, freezing and related preservative processes frequently contribute indirectly as well as directly to overall process cost and processing time and may have deleterious effects on product quality.

SUMMARY OF THE INVENTION

This invention provides for heat treating a food product as a preliminary step in a preservative process, by simultaneously exposing the product to both microwave irradiation and a hot gas flow of controlled humidity. By varying the humidity of the gas flow in the course of the irradiation and by utilizing a specialized continuous processing chamber, very pronounced economies and product improvements are realized.

The microwave energy interacts primarily with the water content of the product and thus a very rapid generation of heat occurs throughout the product volume. However, microwave heating alone will not accomplish the desired blanching or cooking in the most advantageous manner. A first significant factor, which is in direct contrast to conventional heating, is that the surface regions of the product tend to remain cooler than the interior. This results since the heat is generated within the product driving water outwardly with the evaporation of the constituent water tending to occur primarily near the surface. Using microwave heating alone, this may result in under-heating of the product surface or over-heating of the interior with unnecessarily prolonged processing times. In addition, surface characteristics such as crispness, coloration and the like which the consumer associates with a product may not be produced. A second highly significant factor is that microwave energy is an inherently expensive method of supplying heat to a product. Substantial economies are realized if some portion of the heat can be supplied by less costly means.

These problems are met in the present invention by the supplementary effect of the controlled gas flow. Additional relatively low cost heat is supplied to the surface of the product so that adequate blanching or cooking of the superficial regions are assured. In order to reduce the evaporative cooling at the product surface a very humid gas flow may be utilized during the initial portions of the microwave irradiation. When the desired degree of surface heating has been accomplished, the humidity of the gas flow may then be reduced to a very low value during the subsequent irradiation period to produce several advantageous results.

Most significantly, the drier hot gas flow continues to supply heat to the product while effecting a partial drying thereof. The result is exactly opposite to that of the conventional blanching or cooking techniques in which the water content of the product is increased. Owing to the reduction of moisture content, the product may then be dried, frozen, freeze dried, or dehydrofrozen, with substantially less energy requirements and with shortened processing time.

To utilize this method in the most efficient manner, the products are moved continuously through a tunnel, having electrically conductive walls, by a powered conveyor. Microwave energy is injected into the tunnel in a direction normal to the axis thereof and thus passes repeatedly through the product while undergoing reflection between opposite walls of the tunnel. To provide for more uniform atmosphere throughout the chamber, the controlled gas flow is preferably supplied through a conduit extending along the conveyor and having small gas outlets distributed along the length thereof. To provide for maximum exposure of the product surface to the gas flow, the conveyor is preferably an open mesh belt or other similar porous element.

Accordingly, it is an object of the invention to provide for greater efficiency, reduced costs, shortened processing times, and improved product quality in a food preservation apparatus and process of the class which primarily affects the water content of the product.

The invention, together with further objects and advantages thereof, will be better underdstood by reference to the following description of preferred embodiments in conjunction with the accompanying drawings.

BRIEF DESCRIPTION OF THE DRAWINGS

In the accompanying drawings, FIGURE 1 is a broken out elevation view of a microwave processing chamber in accordance with the invention, certain of the elements of the chamber being shown schematically;

FIGURE 2 is a cross-section view of the process chamber of FIGURE 1 taken along line 2—2 thereof;

FIGURE 3 is an elevation section view of a second form of process chamber embodying the invention; and FIGURE 4 is a cross-section view taken along line 4—4 of FIGURE 3.

DESCRIPTION OF THE PREFERRED EMBODIMENTS

Referring now to the drawing, and more particularly to FIGURES 1 and 2 thereof, there is shown a microwave chamber 11 uniquely adapted for blanching or pre-cooking food products on a continuous process basis, as a preliminary step to drying or freezing of the product, the chamber being of the general type disclosed in the hereinbefore identified copending application Ser. No. 245,010 (now abandoned), filed Dec. 17, 1962 by Morris R. Jeppson and entitled Continuous Process Microwave Heating Chamber and in copending application Ser. No. 497,433, filed Oct. 18, 1965 and having the same title now abandoned.

Basic elements of the chamber 11 include a long tunnel 12 formed of electrical conductor and which may have a rectangular cross-section. The central portion of the top wall of tunnel 12 is formed by a waveguide 13 that extends along the top of the tunnel and is coupled to a microwave source 14. To provide for the injection of the microwave energy into the tunnel 12, a series of transverse slots 16 are formed along the lower wall of the waveguide, this microwave injection structure being more fully described and claimed in Jeppson et al., U.S. Patent No. 3,263,052, issued July 26, 1966, and entitled Power Distribution System for Microwave Process Chambers.

To suppress unwanted emission of microwave energy from the ends of the tunnel 12, terminating sections 17 and 17' are disposed at the opposite ends thereof. Sections 17 and 17' effectively form extensions of the tunnel 12 and are formed with conducting outer walls 18 and dielectric inner walls 19 between which a volume of water 21 or other lossy fluid is maintained. Injected energy propagates toward the ends of tunnel 12 principally by repeated reflections between opposite walls thereof so that when it reaches the terminating sections 17 and 17' it is attenuated by repeated passage through the water volumes 21. The structure and operation of the terminating sections 17 and 17' are discussed in more detail in the hereinbefore identified copending applications Ser. No. 245,010 and Ser. No. 497,433 both now abandoned.

A transverse baffle 22 extends across each end of tunnel 12 at the junctures of the tunnel with the terminating sections 17 and 17', the baffles being formed of electrical conductor to aid in suppressing the emission of microwave from the chamber. Baffles 22 serve the further purpose of limiting the outflow of controlled atmosphere from the chamber to preferred rates. Each baffle 22 has an opening 23 extending thereacross at an intermediate level to provide for the passage of a conveyor belt 24 which carries products through the chamber, the opening having a central portion of sufficient height to allow the products to pass through the baffle. An inwardly directed lip 26 is provided around the edge of the opening 23 and extends a short distance into the tunnel 12, to reduce microwave transmission through the opening.

The conveyor belt 24 is carried on two rotatable drums 27 which are mounted at opposite ends of the chamber 11, one drum being driven by a variable speed motor 28 through a speed reduction gearbox 29. Within the tunnel 12, the edges of belt 24 ride along rails 31 which extend along the opposite lateral walls of the tunnel.

In order to allow the controlled gas flow to be directed upwardly around the surfaces of products carried on belt 24, the belt is a porous screen or mesh and is formed of a corrosion resistant material capable of withstanding high temperatures and having adequate mechanical strength. Glass fiber screen is one example of a material which may be used for this purpose. While it is possible to employ a metal screen material for the belt 24, a dielectric material such as glass fiber is usually preferable as it is virtually transparent to microwave energy.

As the chamber 11 may be used to process substances that release liquids, such as fatty meats, a removable pan 32 is disposed on the floor of tunnel 12 beneath the porous belt 24 to receive such liquids.

Considering now the means by which an atmosphere of selectively variable temperature and humidity may be passed through the chamber 11, a pipe 33 extends along the length of tunnel 12 beneath the belt 24. Pipe 33 has a series of very narrow slits 34 spaced along the length thereof, the slits being on the underside of the pipe so that liquids or other material dropping through the belt 24 will not enter the pipe or clog the slits. The slits 34 are considerably thinner than the slots 16 of waveguide 13, and have a thickness less than the microwave wavelength, so that no significant amount of microwave energy enters the pipe 33.

By distributing the gas inflow along the belt 24 in close proximity to the product thereon in this manner, a much more precise and uniform control of process conditions is realized. If the gas were to be emitted only at one point, or a limited number of points, both temperature and humidity changes would occur as the flow moved along the chamber.

To provide the gas flow of control temperature and humidity, a gas source 36 is connected with an end of pipe 33 which projects through one sidewall of the tunnel; the other end of the pipe being closed. Source 36 in this embodiment may be used to supply either air or other gas at virtually any selected temperature and humidity thus adapting this particular chamber for treating a variety of differing products. However, where the chamber is designed for a specific product or group of similar products, some of the components of this complex system may be omitted. In some blanching or cooking operations, relatively simple steam suply may be used to provide hot humid gas together with a means for burning natural gas and for directing the combustion products into the pipe 33 as a hot dry gas source for the second phase of the process.

Source 36 in this embodiment comprises a blower or air pump 37, having a filter 38 at the intake which connects with a heating unit 39 of a type suitable for heating a gas flow to a selected temperature. The connection of blower 37 to heater 39 is through a first valve 41 and the outlet of the heater connects to pipe 33 through a three position second valve 42 which will be hereinafter described in greater detail.

Further components of this particular gas source 36 include a suitable gas dehumidifier or dryer 43 which has an inlet connected between blower 37 and first valve 41 through a four position third valve 44 and which has an outlet connected between first valve 41 and heater 39 through a four position fourth valve 46. One position of the third valve 44 connects the outlet of the blower 37 to the intake of the dryer 43, the second position of the valve 44 connects the intake of the dryer with a normally closed fitting 47 through which a gas other than air may be admitted to the system if desired. A third position of the third valve 44 connects the fitting 47 to the first valve 41, while disconnecting the dryer 43 therefrom, and the fourth position of the valve 44 closes both the fitting and the dryer intake.

A first position of the fourth valve 46 connects the outlet of dryer 43 to the connection between first valve 41 and heater 39, a second position of the valve 46 connects the outlet of the dryer with the input of a heat exchanger 48, and a third position of the valve 46 connects the heat exchanger input to the intake of the heater while disconnecting the dryer therefrom. The fourth position of valve 46 closes both the dryer outlet and the heat exchanger input thereby uncoupling both such units from the system.

The heat exchanger 48 may be employed where the gas requires only minor temperature change before entering the tunnel 12. Thus in order that the gas input from blower 37 or fitting 47 map be routed through the heat exchanger 48 rather than heater 39 if desired, the output of the exchanger connects to the previously described second valve 42 through an additional valve 49. A second normally closed fitting 51 is provided at the connection between valves 42 and 49 to provide for the admission of steam or other humid gaseous additives to the pipe 33 to impart the desired degree of humidity to the gas flow.

Second valve 42 has a first position which connects the heater 39 to pipe 33, a second position which maintains this connection while also connecting fitting 51 with pipe 33, a third position which disconnects the heater outlet from the pipe and couples the heat exchanger outlet valve 49 and fitting 51 thereto, and a fourth position which isolates all components of the controlled atmosphere source 36 from the chamber 11.

It may be seen from the analysis of the above described valve positions that the system provides for generating a flow of air or any other gas having a selected temperature and humidity and both may be changed as desired as the products pass through the chamber. For example, air from blower 37 or gas from fitting 47 may be routed directly through the heater 39 or alternately through the heat exchanger 48 for milder heating or cooling. In either case, the flow may be directed through dryer 43 or may by-pass such unit. In addition, a controlled amount of steam or other gaseous additive may be added to the flow as desired.

In operation, substances which are to undergo treatment in the chamber 11 are carried therethrough on conveyor 24. Microwave source 14 is energized to generate internal heat within the substance and an appropriate gas flow is injected into the chamber from source 36. The controlled gas flow is emitted into the lower portion of tunnel 12 along the length of pipe 33 and passes upwardly through the porous conveyor 24 to reach all surfaces of the substances carried thereon. The gas flow then exhausts from the chamber 11 through openings 23 of the end baffles 22. It should be noted that in a high capacity operation, part of the heat content of the exhaust flow may be recovered by channeling the exhaust through a heat exchanger which is thermally coupled to the inflowing gas.

The effects on the product resulting from processing in the chamber 11 are determined by several variables which can be selected to provide the desired results. Such variables include the temperature, humidity, flow rate and type of gas from the controlled source 36 in addition to the frequency and power level of the microwave input. To provide a convenient means of monitoring certain of these variables, a temperature and humidity gauge 52 is coupled to the chamber and a flowmeter 53 is connected with the input end of pipe 33.

The product is also affected by the transit time through tunnel 12 which may be controlled by adjustment of motor 28. Additional significant variables which are usually subject to some control are the thickness and configuration of units of the product and the loading density of the product in the chamber. Specific examples of suitable process conditions will be hereinafter described in conjunction with the method of the invention.

Where the gas temperature or humidity or both are to be changed during the microwave irradiation, the products may be repetitively passed through the tunnel with appropriate changes for each pass or may travel through the tunnel 12 in separated groups with the change being effected by adjustment of source 36 at the appropriate point in the passage of each group through the chamber. In an alternate technique, the products are successively passed through two or more of the tunnels 12, or through a compartmentalized tunnel, having appropriately different gas flow characteristics.

Apparatus embodying the invention and suitable for practicing the method of the invention may take forms which differ from that described above with reference to FIGURES 1 and 2. Referring now to FIGURES 3 and 4, there is shown a second form of microwave chamber 54 particularly adapted for handling liquid, viscous, powdered and particulate products.

In the chamber 54, the product to be treated is subjected to microwave heating and a gas flow of regulated temperature and humidity while falling through an upright long cylindrical casing 56 as indicated by arrow 57. Casing 56 is formed of electrical conductor and is provided with conducting upper and lower end closures 58 and 59 respectively. To provide for the input of the product, a feed pipe 61 transpierces the upper closure 58 and extends a small distance downwardly into the casing along the axis thereof.

A product output pipe 62 transpierces the lower closure 59, at the axis of the casing 56, and communicates with a flaring conical receiver 63 disposed inside casing 56 immediately above the lower closure and in position to collect the product which has dropped through the casing.

To supply the gas flow to casing 56 a source 64 is connected to the lower end of the casing through a conduit 66. Source 64 may be similar to that hereinbefore described with reference to the embodiment of FIGURES 1 and 2 and, as previously discussed, may not necessarily require all of the components of a general purpose source depending on the precise processes to be performed in the chamber 54. In some instances it may not be necessary to forcibly pump the gas into the casing 56 as a substantial natural draft may exist therein.

A gas flow outlet conduit 67 connects to the upper end of casing 56 and may lead to an exhaust vent or to the source 64 for recycling. To avoid the accumulation of product at the bottom of casing 56 and to provide for a uniform gas flow within the casing, a conical baffle 63 is disposed coaxially in the lower portion of the casing. The upper end of baffle 68 has a diameter equal to that of the casing 56 and has a narrower lower end which extends a distance downwardly into receiver 63 in spaced relation therefrom, the spacing allowing gas from source 64 to flow between the receiver and baffle and enter the product region. Similarly, an annular baffle 69 is disposed coaxially in casing 56 immediately beneath gas outlet conduit 67 and is formed with a downwardly projecting central section 53 which encircles the lower end of product input pipe 61 in spaced relation therefrom.

Microwave power is injected into casing 56 through three waveguides 71 which are disposed within the casing in parallel relationship to the axis thereof. Waveguides 71, which are of circular cross-section, are equidistantly spaced from the axis of casing 56 and are disposed equiangularly therearound. The upper end of each waveguide is angled and transpierced through the casing 56 to connect with its separate microwave source 72.

A series of slots 73 are distributed along the length of each waveguide 71, on the sides thereof which face the center of casing 56, to provide for the emission of microwave energy towards the product as it falls along the axis of the casing. A more detailed discussion of the slotted waveguide injection mechanism, as well as a discussion of the advantages of the cylindrical geometry of this chamber 11 in concentrating microwave energy at the axis of the casing where the product is situated, may be found in the hereinbefore identified U.S. Patent No. 3,263,052

In operation, the product is fed into the chamber 54 through pipe 61 and is collected at the bottom of the casing by receiver 63 from which it passes into outlet pipe 62. Microwave sources 72 operate to direct microwave energy through the product as it falls through the casing 56 while controlled atmosphere source 64 is operated to provide the desired gas flow around the product in accordance with the techniques herein discussed. A typical operation for which the chamber 54 is particularly adapted is the blanching of onion or potato flakes, spices and citrus powders as a preliminary step in the dehydration thereof. Where longer processing times are required that can be obtained with a chamber 54 of maximum practical height, the product may be passed through a series of such chambers or may be recycled through the same chamber.

Considered broadly, the method of the invention provides for blanching or pre-cooking of a food product as a preliminary step to preservation treatment of the type which requires evaporating or freezing of the constituent water contained in the product, the preliminary heating step being accomplished by the combination of microwave heating and the passage of a hot gas flow around the exterior surface of the product. In a particularly advantageous form, the method further provides for maintaining a high humidity in the gas flow during the initial period of the microwave irradiation in order to counteract evaporative cooling and assure adequate heating of the surface regions of the product, and then maintaining a low humidity in the gas flow during the subsequent period of the microwave irradiation in order to bring about a further partial drying.

The temperatures and humidities of the gas flow are dependent upon the particular product and on whether blanching or pre-cooking, and possibly surface coloration, of the product is desired but will in general range from about 170° F. to about 212° F. with very high humidity for the initial phase while lower temperatures and generally minimized humidity may be used for the subsequent irradiation period. Where surface crispness or coloration is desired, as in processing sliced meats such as bacon, the temperature of the dry gas flow may be briefly raised, typically to values ranging up to 1000° F., after partial drying has occurred. Suitable exact temperatures, humidities and processing times for various specific products will hereinafter be given in connection with examples of the method and the precise optimum process conditions for other products may be determined empirically when necessary by trial processing followed by appropriate adjustments of the processing chamber.

As hereinbefore discussed, blanching or pre-cooking food products in food preservation processes of this general type by the present techniques has the unique advantage of reducing the water content of the product so that the subsequent steps in the preserving process require less energy and less time in order to freeze, evaporate, or otherwise treat the constituent water of the product. In general from 10% to 50% of the weight of a food may be removed during blanching or pre-cooking operations by the present method without adverse effects on quality. Conventional steam or hot water treatment in contrast may typically add to the moisture content by a factor of 5 to 10%.

Considering now a first example of the application of the method to a specific product, twenty-four shrimp, weighing 125 grams, were pre-cooked by passage through a microwave tunnel of the class hereinbefore described which was operated at a power level of 23 kilowatts at 915 megacycles. An initial 65 second passage through the tunnel in a steam atmosphere heated the shrimp to 200° F. Juice and moisture losses amounted to 22 grams. Appearance and color were excellent with no physical shrink observed. Two additional passages through the tunnel were made with the shrimp exposed to a flow of 160° F. dry hot air. The first additional pass reduced the weight from 103 grams to 93 grams without significant change in physical dimensions. The second additional pass reduced the weight to 83 grams and some shrinkage was observed. At this point the weight of the shrimp had been reduced by 34% and the amount of water therein had been reduced by approximately 45%. The shrimp was subsequently frozen with approximately one half the power requirements which would have been needed to freeze the original 125 grams. After storage in a freezer, the shrimp was reconstituted in water to a weight of approximately 120 grams and found to be of excellent quality.

Other similarly processed shrimp samples were subsequently freeze dried in vacuum. Again the energy required to sublimate the remaining 55% moisture content was substantially less than that needed to freeze dry 125 grams, particularly when subjected to conventional steam or hot water blanching which adds to the moisture content.

Still another 125 gram sample of shrimp, blanched and preliminarily partially dried as described above, was subsequently finish dried to a final weight of 36 grams by a combination of microwave heat input and 160° dry air flow. The shrimp were reduced to about one half the original size, and did not reconstitute well, but were clearly of superior quality relative to conventional air dried shrimp.

In another example of the practice of the invention, fall crop yellow onions were cut into three-eighth-inch thick-slices and blanched by passage through a microwave tunnel of the type hereinbefore described which was operated at 915 megacycles at a power level of 6 kw. A sample containing 1542 grams of the onion slices was passed through the tunnel with a transit time of 3.5 minutes and in the presence of a dry air flow at 158° F. Blanching was accomplished without the initial use of a humid gas flow owing to the relatively low level of microwave power input. At this power level, surface dehydration and hardening effects were minimal. Three additional passes through the tunnel reduced the moisture content by more than 50%, thus preparing the onions for preservative treatment by dehydrofreezing.

Another sample, composed of green onions with an initial weight of 406.5 grams, was also blanched and partially dried as described above after which the weight was found to be 235 grams. The sample was then finished dried to a final weight of 41 grams yielding an extremely high quality product.

In still another example of the practice of the invention, 473 grams of mushrooms were blanced by being heated to 190° F. during a 65 second passage through the tunnel which was operated at 950 megacycles at a power intensity of ⅓ kw. per cubic foot and in which a steam atmosphere was provided. The weight of the sample was then 318 grams. The sample was then dried by exposure to an air flow at 160° F. to a weight of 104 grams and subsequently finished dried by continued exposure to the same air flow supplemented by microwave heat input. The final rehyrated product, of excellent quality, had a weight of 41 grams.

Utilizing microwave energy in this manner to supplement the final phases of the drying is particularly advantageous in that the residual moisture is more readily removed. It may not always be desirable to supplement the intermediate stages of the drying in this manner due to sparking problems at the product which may occur in some cases. Such sparking does not tend to occur in the relatively humid environment which exists around the product surface during the blanching period and while the moisture content is still relatively high and thus microwave may readily be used at such times. Similarly, sparking is not a problem when the moisture level has dropped to around 20% to 40% and thus microwave energy may also be freely used for the final phases of the finish drying.

While the invention has been disclosed with respect to certain exemplary embodiments, numerous variations are possible within the scope of the invention and it is not intended to limit the same except as defined in the following claims.

What is claimed is:

1. In an apparatus for heat treating food products and the like, said apparatus being of the class having a tunnel with electrically conductive walls and means for injecting microwave energy therein, the combination comprising a conveyor for carrying said products through said tunnel, a gas conduit separate from said means for injecting microwave energy extending along said conveyor and having gas outlet means along at least a substantial portion of the length thereof, and a source for supplying gas at controlled temperature and humidity to said conduit.

2. The combination defined in claim 1 wherein said conveyor is porous to provide for maximum exposure of said products to said gas flow.

3. The combination defined in claim 1 wherein said conveyor is comprised of a dielectric belt formed of porous screen material, porous to the flow of gas therethrough.

4. The combination defined in claim 1 wherein said conveyor extends substantially horizontally and wherein said means for injecting microwave energy is disposed above said conveyor and said gas conduit is disposed below said conveyor, said gas outlets of said conduit being situated on the underside thereof.

5. The combination defined in claim 1 wherein said conduit has a plurality of openings distributed therealong, each of said openings being of less extent in at least one direction than the wavelength of said microwaves.

6. In an apparatus for heat treating food products and the like, said apparatus being of the class having a tunnel with electrically conductive walls and means for injecting microwave energy therein, the combination comprising a conveyor for carrying said products through said tunnel, a gas conduit extending along said conveyor and having gas outlet means along at least a substantial portion of the length thereof, and a source for supplying gas at controlled temperature and humidity to said conduit, said gas source is provided with means for varying the humidity of the gas supplied to said conduit.

7. The combination defined in claim 1 where in said gas source is comprised of means for selectively admitting steam into said conduit and for disconnecting said steam therefrom and admitting heated dry air into said conduit.

8. Apparatus for the continuous process heating of food products and the like comprising a housing having electrically conductive walls and having a product input opening at the top and a product output opening at the bottom whereby said products may be dropped through said housing, said housing further having a gas inlet at the bottom region and a gas outlet at the top region whereby a flow of gas may be directed through said housing in a generally upward direction, means for injecting microwave energy into said housing, and a gas source coupled to said gas inlet, said source having means for providing a gas flow of selected humidity to said inlet.

9. In an apparatus for heat treating food products and the like, said apparatus being of the class having a tunnel with electrically conductive walls and means for injecting microwave energy therein, the combination comprising a conveyor for carrying said products through said tunnel, a gas conduit extending along said conveyor and having gas outlet means along at least a substantial portion of the length thereof, and a source for supplying gas at controlled temperature and at a relatively high humidity to said conduit to reduce food product surface evaporation.

10. In an apparatus for heat treating food products and the like, said apparatus being of the class having a tunnel with electrically conductive walls and means for injecting microwave energy therein, the combination comprising a conveyor for carrying said products through said tunnel, a gas conduit adjacent and extending along said conveyor and having gas outlet means along at least a substantial portion of the length thereof for impinging gas on the food product surface, and a source for supplying gas at controlled temperature and humidity to said conduit.

References Cited

UNITED STATES PATENTS

| | | | |
|---|---|---|---|
| 3,235,971 | 2/1966 | Tooby | 34—1 |
| 3,249,446 | 5/1966 | Tooby | 99—217 |
| 3,263,052 | 7/1966 | Jeppson et al. | 219—10.55 |
| 3,321,314 | 5/1967 | Jeppson | 219—10.55 X |
| 3,335,253 | 8/1967 | Jeppson et al. | 219—10.55 |

JOSEPH V. TRUHE, Primary Examiner

L. H. BENDER, Assistant Examiner

U.S. Cl. X.R.

219—10.69